United States Patent [19]

Ferris et al.

[11] Patent Number: 4,668,115
[45] Date of Patent: May 26, 1987

[54] HELICOPTER ROTOR SPINDLE RETENTION ASSEMBLY

[75] Inventors: Donald L. Ferris, Newtown; Herbert Heise, Oxford, both of Conn.

[73] Assignee: United Technologies Corporation, Hartford, Conn.

[21] Appl. No.: 857,672

[22] Filed: Apr. 30, 1986

[51] Int. Cl.⁴ .............................................. F16D 1/00
[52] U.S. Cl. .................................... 403/24; 403/326; 403/261
[58] Field of Search ............... 403/326, 261, 262, 317, 403/24

[56] References Cited

U.S. PATENT DOCUMENTS

| | | |
|---|---|---|
| 250,088 | 11/1881 | Loehner .............................. 384/259 |
| 2,278,625 | 4/1942 | Traylor et al. .................. 403/345 X |
| 3,112,941 | 12/1963 | Dutton ................................ 285/142 |
| 3,434,747 | 3/1969 | Nichols ................................. 287/53 |
| 3,594,024 | 7/1971 | Hertell ................................ 403/262 |
| 3,867,871 | 2/1975 | Shore ............................ 403/261 X |
| 4,004,499 | 1/1977 | Beck ............................... 403/261 X |
| 4,012,154 | 3/1977 | Durwin et al. ..................... 403/261 |
| 4,373,862 | 2/1983 | Ferris et al. .......................... 416/61 |

Primary Examiner—Andrew V. Kundrat
Attorney, Agent, or Firm—Lloyd D. Doigan

[57] ABSTRACT

A threadless retention apparatus holds a spindle (2) against a bearing (22) in a helicopter hub and has a split ring (10) mating with an annular spindle groove (4) and a loading hoop (32) holding the ring (10) within the groove (4), the loading hoop (32) locating the ring (10) and spindle (2) in relation to the bearing (10) as a unit.

8 Claims, 1 Drawing Figure

U.S. Patent May 26, 1987 4,668,115
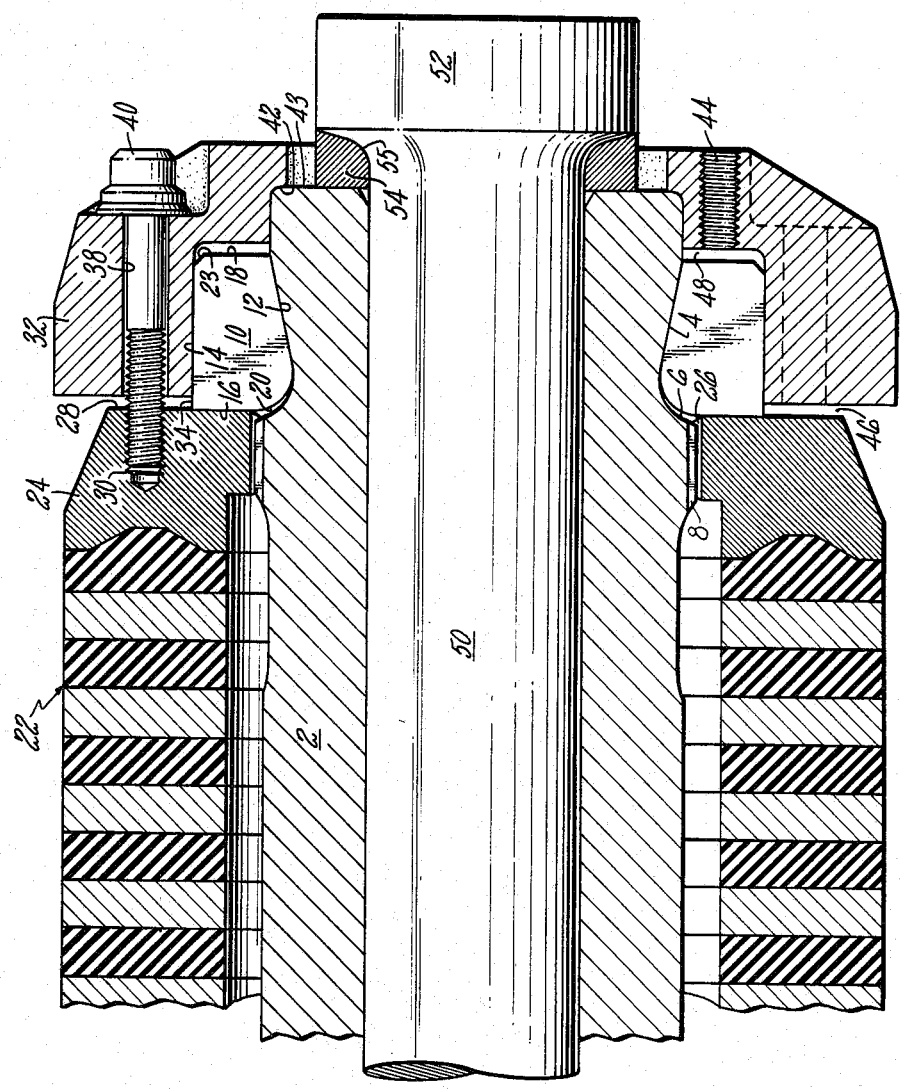

HELICOPTER ROTOR SPINDLE RETENTION ASSEMBLY

TECHNICAL FIELD

This invention relates generally to a centrifugal spindle retention assembly and specifically to a helicopter rotor spindle retention assembly.

BACKGROUND ART

Typically, a modern helicopter rotor blade terminates inwardly at a longitudinally extending spindle which is concentrically received within an elastomeric bearing assembly carried within a rotatable hub. Large centrifugal loads generated by a rotating blade are carried through the spindle and into the bearing assembly.

In one known configuration, the blade spindle is attached to the elastomeric bearing assembly by a nut that is threaded onto an end of the spindle and attached longitudinally to an end of the bearing assembly by a plurality of bolts. A high precision fit between such threaded connectors (which may be difficult to achieve with reasonable economy) in such a spindle-bearing subassembly is necessary to control stress levels and stress distribution during operating conditions particularly along the thread of the nut and the spindle. Uneven stress distribution could increase the risk of mechanical failure of the spindle-bearing assembly.

It might be assumed that a threadless connector would be ideal for helicopter usage since threadless connectors eliminate the problem of the uneven loading a plurality of individual threads and are easily manufactured. To date, however, threadless connections have been found to be generally unsuited to accommodate the rigorous blade loading forces generated in helicopter usage. Typically, prior art threadless connections, as exemplified by U.S. Pat. Nos. 2,278,625 and 3,867,871, have a ring member that, upon assembly of the threadless connection, is driven into an annular groove in a spindle by a cooperating, surrounding loading hoop. As the ring is driven into the groove by the loading hoop, the ring cooperates with the spindle to locate the spindle in relation to a bearing. In order to properly locate the spindle against the bearing, the ring may be mechanically deformed by the driving action of the surrounding hoop. Any deformation may create weaknesses and uneven loading that could lead to failure.

The prior art generally fails to recognize that the threadless rings must be precisely located within the spindle grooves during centrifugal loading under operating conditions. An improperly located ring may cause uneven loading and wear that may lead to failure, particularly given the high loads encountered in helicopter operation. When a ring is driven into a groove, it is very difficult to ensure that the ring is precisely located within the spindle groove. By precisely locating the rings in the spindle grooves, wear and fretting is minimized and reliability against centrifugal load is maximized.

Accordingly, what is needed in the art is an improved threadless retention structure having an established relative position between a ring and a spindle prior to and after loading the ring against a bearing to minimize wear, uneven loading, fretting and concentrated stress caused by deformation. The retention structure should have a minimum number of parts, be highly reliable and be inexpensive to construct and maintain.

DISCLOSURE OF INVENTION

It is an object of this invention to provide an improved highly reliable retention assembly having a minimum number of parts.

It is a further object of this invention to reduce the complexity of the manufacture of the assembly by providing a threadless retention assembly.

It is a further object of the invention to provide a threadless assembly capable of assembly without any deformation and having sufficient precision between the assembly parts to withstand centrifugal loading and bending under operating conditions.

It is a further object of the invention to provide a preloaded retention assembly to reduce wear during normal operating conditions.

These and other objects of the invention are accomplished by a threadless retention apparatus for holding a spindle against a bearing in a helicopter, the retention apparatus having a split ring mating precisely with an annular spindle groove and a loading hoop holding the ring within the groove, the loading hoop locating both the split ring and spindle in relation to the bearing as a unit.

The split ring and spindle are machined precisely to have the split ring fitted exactly to the spindle before loading against the bearing. The relative position between the ring and the spindle is controlled exactly, thereby reducing fretting, wear and deformation, thereby enhancing the retention reliability critical to helicopter safety and not found in prior art threadless retention assemblies. Additionally, the assembly manufacture is simpler as the multiplicity of precision surfaces required by a threaded nut and spindle is eliminated.

BRIEF DESCRIPTION OF DRAWING

The sole FIGURE is a sectional elevation of the retention assembly of this invention.

BEST MODE FOR CARRYING OUT THE INVENTION

Referring to the FIGURE, a large diameter helicopter rotor blade spindle 2 has an annular groove 4 about a lateral surface thereof. The groove has a continually tapering cross section with a larger diameter at the longitudinally inboard surface of the groove and a smaller diameter at the groove's longitudinally outboard surface. The outboard side of the groove arcs at section 6 to eliminate stress lines across the spindle cross section that might be caused by a sharply angled section between the groove and spindle lateral surface. The tapered section of the groove deviates radially inwardly from the lateral surface of the spindle at an angle of approximately 20°. Steeper angles provide for greater axial load accommodation while more gradual angles provide more radial load transmission. Outboard, of the groove, the spindle has an annular splined section 8 as will be discussed infra. Typically, the spindle is constructed of titanium. Titanium is ideal for usuage in helicopters due to its inherent fatigue strength and relatively lightweight.

The groove mates with a split ring 10 having two identical, semiannular sections, each section having an inner lateral face 12 mating precisely with the tapering section of the groove and an outer lateral face 14 for the retention of the ring within the groove as will be discussed infra. The ring sections each have parallel end faces 16, 18, the outboard face 16 abutting a bearing 22 for centrifugal and bending load transmission as will be discussed, infra. Face 16 has a rounded edge 20 curving into lateral face 12 to conform with the spindle groove 4. A chamfer 23 is formed between face 14 and face 18 of each ring section for ease of assembly as will be discussed infra. The split ring sections are constructed of corrosion and wear resistant materials with either stainless steel or beryllium-copper alloy being preferred.

An annular elastomeric bearing 22 surrounds a longitudinal section of the spindle outboard from the groove 4. The bearing 22 has a disc-shaped titanium end plate 24 having a radially inner splined section 26 mating with the spindle splined section 8. The splines transmit torsionally twisting loads from the spindle to the bearing when the helicopter blade (not shown) and spindle pitch or torsionally twist about a blade longitudinal axis. The bearing end plate 24 has a flat, inboard end surface 28 which abuts face 16 of each split ring section. Centrifugal load from a blade rotating with a helicopter hub (not shown) is transferred through the spindle and into the bearing via the split ring. The end plate has a plurality or radially spaced threaded holes 30 for attaching a loading hoop 32 thereto.

To hold the ring sections within the groove and properly locate the spindle and rings as a unit in relation to the bearing, the loading loop 32 surrounds the ring sections. The loading hoop 32 has an inner lateral face 34 mating with the outer lateral face 14 of each of the split ring sections. The loading hoop fits tightly around the ring sections to ensure that the ring sections are retained in their mating position against the spindle, but not so tightly that deformation might occur. The chamfer 23 between face 18 and face 14 of each ring section helps center the loading hoop 32 by radially guiding the inner lateral face 34 of the loading hoop about the split ring 10. The loading hoop has a shoulder 42 extending radially inwardly for abutment with the end face 43 of the spindle 2 to locate the spindle in relation to the bearing as will be discussed, infra. A plurality of circumferentially spaced longitudinal holes 38 are provided through the loading hoop, in alignment with the threaded holes 30 provided in bearing end plate 24. Bolts 40 are received through holes 38 into the threaded holes 30 in the bearing end plate. Circumferentially spaced jack-out threaded holes 44 are provided in the loading hoop for ease of disassembly.

A baked on dry film lubricant may coat the mating surfaces of the spindle and split ring to reduce chafing or fretting between the parts.

Upon assembly of the threadless retention apparatus, the spindle is inserted through the bearing. The split ring sections are placed with their inner faces 12 mating with the spindle groove 4. The ring sections and the spindle groove are manufactured to provide an exacting fit therebetween. The loading hoop 32 is positioned around the ring sections and the bolts 40 are inserted within holes 30, 38 and tightened. As the bolts are tightened, the loading hoop shoulder 42 contacts the end 43 of the spindle 2 and the spindle and the split ring move together as a unit until the split ring contacts the bearing end plate 24 and the spindle is properly located within the bearing. At this point, the bolts are fully tightened and assembly is complete. As illustrated, gaps 46 and 48 are defined between the loading hoop 32 and the end face 16 of bearing 22 and the loading hoop 32 and the face 18 of ring sections 10, the gaps ensuring both that the loading hoop will not contact face 18 of the split rings during tightening, thereby avoiding deforming the ring, and that the hoop will not contact the bearing before the split rings and spindle are properly located. By machining the surface 12 of the ring sections and the groove 4 of the spindle to mate with each other, the multiplicity of precision surfaces required by a threaded nut and spindle are eliminated and the problems of deformation and uneven loading of prior art threadless connectors are overcome. Chafing, fretting and mechanical deformation are largely eliminated by maintaining the relative position of the surfaces 4 and 12 prior to and after assembly.

Precision surfaces may be inspected by removing the loading hoop 32 from around the split ring 10 by removing the bolts 40 and threading them into the jack-out threaded holes 44 in the loading hoop 32. The bolts, when tightened, bear against face 18 of split ring 10 and threaded holes 44, pushing the loading hoop from around the split ring sections.

The blade centrifugal or tensile load travels inboard the length of the spindle 22 to its inboard end, transferring at, and through, the split rings 10 to the bearing 22. The tension load may be shared by the spindle with a bolt 50 located in a spindle bore as shown in FIG. 1.

The bolt 50 has a head 52 and an annular washer 54 having a rounded inner edge 55 provided at the end face 43 of the spindle. The bolt 50 is connected through a nut to an outboard end of the spindle (not shown) prior to installation of the spindle within the helicopter hub. Connecting the spindle ends with bolt 50 subjects the bolt to a centriful tension load upon helicopter operation, that translates through the bolt head 52 so as to create a longitudinal compression load path through the washer 54, the spindle end 43, the split ring 10 and into the bearing 22. The rounded edge of the washer centers the bolt so as to provide uniform tensile loading across a bolt cross section. Thus, the bolt 50 creates a second load path with the spindle. The bolt 50 either shares the total load or is held in reserve until failure of a portion of the spindle. A failure of the spindle 2 in its cross section, such as a crack which would open to an enlarged condition under centrifugal force, would render the spindle 2 incapable of continued tensile loading. Upon such failure, the bolt 50 will become the primary load path. The spindle would then be relieved of loading for its length outboard of the groove 4.

Accordingly, the present invention provides an inexpensive, highly reliable and easily serviced assembly for holding the inboard end of a spindle against an axial load. The assembly has a minimum of critical parts, is easily made, requiring a minimum of machining operations, and is conveniently inspectable due to the minimum number of critical surfaces.

Although this invention has been shown and described with respect to a preferred embodiment thereof, it will be understood by those skilled in the art that various changes in form and detail thereof may be made without departing from the spirit and scope of the claimed invention.

We claim:

1. An apparatus for retaining a helicopter blade spindle against a centrifugal axial load, the spindle having an inboard end received through a bearing having a support surface, said apparatus being characterized by:

an annular groove in an inboard lateral surface of said spindle;

ring means having an inner first face mating with said groove and a second face for abutting said bearing support surface to transfer thereto, said centrifugal axial loads applied through said spindle and said ring means;

means disposed about said ring means for securing said ring means within said groove; and said means disposed about said ring means abutting said inboard spindle end for loading said ring means against said bearing support surface without relative motion between said ring means and said spindle.

2. The apparatus of claim 1 wherein said groove is tapered and decreases in diameter against said centrifugal axial load.

3. The apparatus of claim 1 wherein said ring means is a split ring.

4. The apparatus of claim 1 wherein said means disposed about said ring means fixedly attaches to said bearing support surface.

5. The apparatus of claim 1 wherein said means disposed about said ring means is characterized by a hoop having a radially inwardly extending shoulder for abutting said inboard spindle end.

6. The apparatus of claim 5 wherein a gap is defined between said hoop and said bearing support surface upon the loading of said ring means against said bearing support surface.

7. The apparatus of claim 6 wherein a gap is defined between said hoop shoulder and said ring means upon the loading of said ring means against said bearing support surface.

8. The apparatus of claim 5 wherein a gap is defined between said hoop shoulder and said ring means upon the loading of said ring means against said bearing support surface.

* * * * *

UNITED STATES PATENT AND TRADEMARK OFFICE
CERTIFICATE OF CORRECTION

PATENT NO. : 4,668,115
DATED : May 26, 1987
INVENTOR(S) : Donald L. Ferris and Herbert Heise It is certified that error appears in the above-identified patent and that said Letters Patent is hereby corrected as shown below:

```
Column 1, line 27   "thread" should read --threads--
Column 2, line 60   "usuage" should read --usage--
Column 3, line 24   "or" should read --of--
Column 4, line 33   "centrifual" should read --centrifugal--
```

Signed and Sealed this

Twenty-sixth Day of July, 1988

Attest:

DONALD J. QUIGG

*Attesting Officer*   *Commissioner of Patents and Trademarks*